(12) United States Patent
Eicher et al.

(10) Patent No.: US 11,029,807 B2
(45) Date of Patent: Jun. 8, 2021

(54) THERMOSTAT WITH AN INTERACTIVE TWISTED NEMATIC DISPLAY

(71) Applicant: Carrier Corporation, Jupiter, FL (US)

(72) Inventors: Brian W. Eicher, Fort Wayne, IN (US); Anthony R. Myers, Huntington, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 306 days.

(21) Appl. No.: 15/296,641

(22) Filed: Oct. 18, 2016

(65) Prior Publication Data

US 2017/0115851 A1    Apr. 27, 2017

Related U.S. Application Data

(60) Provisional application No. 62/244,948, filed on Oct. 22, 2015.

(51) Int. Cl.
| | | |
|---|---|---|
| *G06F 3/048* | (2013.01) | |
| *G06F 3/0481* | (2013.01) | |
| *G06F 3/0485* | (2013.01) | |
| *G06F 3/0484* | (2013.01) | |
| *G06F 3/0482* | (2013.01) | |
| *G05B 19/409* | (2006.01) | |

(52) U.S. Cl.
CPC .......... *G06F 3/04817* (2013.01); *G06F 3/048* (2013.01); *G06F 3/0482* (2013.01); *G06F 3/0485* (2013.01); *G06F 3/04842* (2013.01); *G06F 3/04847* (2013.01); *G05B 19/409* (2013.01); *G05B 2219/2614* (2013.01)

(58) Field of Classification Search
CPC ............ G06F 3/04817; G06F 3/04847; G06F 3/0485; G06F 3/048; G06F 3/0482; G06F 3/04842; G05B 19/409; G05B 2219/2614
See application file for complete search history.

(56) References Cited

U.S. PATENT DOCUMENTS

| | | | |
|---|---|---|---|
| 6,134,019 A | 10/2000 | Wantuck, Jr. et al. | |
| 6,222,539 B1 | 4/2001 | Watts | |
| 6,628,311 B1 | 9/2003 | Fang | |
| 6,824,069 B2 * | 11/2004 | Rosen | G05D 23/1904 236/1 C |
| 9,056,539 B2 * | 6/2015 | Mirza | B60H 1/00985 |
| 10,317,100 B2 * | 6/2019 | Tucker | F24F 11/58 |

(Continued)

OTHER PUBLICATIONS

Honeywell "Wi-Fi Thermostat 9000 Color Touchscreen—User Guide" 2013 Honeywell International Inc. (186 Pages).

(Continued)

*Primary Examiner* — Jennifer E Nichols
(74) *Attorney, Agent, or Firm* — Cantor Colburn LLP

(57) ABSTRACT

An electronic device that may be a thermostat includes a TN display configured to display at least one icon being interactive, and display information requested via the at least one icon. A control module of the electronic device is coupled to the TN display and is configured to receive a control command from the at least one icon and output the information to the TN display. A computer readable memory of the electronic device is coupled to the control module for storing at least a portion of the information.

6 Claims, 2 Drawing Sheets

(56) References Cited

U.S. PATENT DOCUMENTS

| | | | | |
|---|---|---|---|---|
| 2003/0043174 | A1* | 3/2003 | Hinckley | G06F 3/04855 345/684 |
| 2004/0216059 | A1* | 10/2004 | Vong | G06F 3/1431 715/840 |
| 2004/0260427 | A1* | 12/2004 | Wimsatt | G05B 15/02 700/275 |
| 2005/0200598 | A1* | 9/2005 | Hayes | H04B 1/202 345/156 |
| 2006/0016898 | A1* | 1/2006 | Ashworth | G05D 23/1902 236/1 C |
| 2006/0283965 | A1* | 12/2006 | Mueller | G05D 23/1905 236/51 |
| 2007/0136667 | A1 | 6/2007 | Gerhart et al. | |
| 2007/0136694 | A1* | 6/2007 | Friedman | H01H 13/83 715/840 |
| 2007/0236472 | A1* | 10/2007 | Bentsen | G06F 3/03547 345/173 |
| 2007/0257120 | A1* | 11/2007 | Chapman, Jr. | G05D 23/1905 236/94 |
| 2008/0133033 | A1* | 6/2008 | Wolff | G05B 19/0423 700/83 |
| 2008/0301558 | A1 | 12/2008 | Najafi et al. | |
| 2009/0001182 | A1* | 1/2009 | Siddaramanna | F24F 11/30 236/46 R |
| 2009/0140057 | A1* | 6/2009 | Leen | F24F 11/30 236/49.3 |
| 2009/0143916 | A1* | 6/2009 | Boll | G05D 23/1902 700/276 |
| 2009/0158188 | A1* | 6/2009 | Bray | G05B 19/042 715/771 |
| 2009/0172597 | A1* | 7/2009 | Mercer | G06F 3/0482 715/840 |
| 2009/0244012 | A1* | 10/2009 | Behar | G06F 1/1616 345/169 |
| 2009/0262074 | A1* | 10/2009 | Nasiri | G06F 1/1626 345/158 |
| 2009/0271704 | A1 | 10/2009 | Cohen | |
| 2009/0276096 | A1* | 11/2009 | Proffitt | G05B 19/409 700/278 |
| 2010/0044449 | A1 | 2/2010 | Tessier | |
| 2010/0050075 | A1* | 2/2010 | Thorson | B60H 1/00985 715/702 |
| 2011/0157046 | A1* | 6/2011 | Lee | G06F 3/04845 345/173 |
| 2012/0053738 | A1* | 3/2012 | Lingrey | F24F 11/30 700/278 |
| 2012/0089942 | A1* | 4/2012 | Gammon | G06F 3/048 715/784 |
| 2012/0168524 | A1* | 7/2012 | Moore | G05D 23/1917 236/1 C |
| 2012/0319851 | A1 | 12/2012 | Hoglund et al. | |
| 2013/0067410 | A1* | 3/2013 | Shoji | G06F 3/0481 715/829 |
| 2014/0082492 | A1 | 3/2014 | Sutardja et al. | |
| 2014/0118285 | A1* | 5/2014 | Poplawski | G06F 3/041 345/173 |
| 2014/0137029 | A1* | 5/2014 | Stephenson | G06F 3/0486 715/784 |
| 2014/0218307 | A1 | 8/2014 | Goldman-Shenhar et al. | |
| 2014/0324228 | A1* | 10/2014 | Vozenilek | G05D 23/1904 700/276 |
| 2014/0372886 | A1 | 12/2014 | Ramasubramanian | |
| 2015/0012885 | A1* | 1/2015 | Bergdahl | G06F 3/04842 715/821 |
| 2015/0163945 | A1* | 6/2015 | Barton | F21V 23/005 361/809 |
| 2015/0177948 | A1* | 6/2015 | Sasaki | G08C 17/00 715/740 |
| 2015/0277702 | A1* | 10/2015 | Hardwick | H04M 1/72583 715/835 |
| 2016/0124628 | A1* | 5/2016 | Poplawski | G06F 3/04817 715/771 |
| 2016/0189491 | A1* | 6/2016 | Sloo | G08B 5/36 340/686.6 |
| 2016/0299629 | A1* | 10/2016 | Doyle | H01L 27/323 |
| 2016/0313018 | A1* | 10/2016 | Leeland | F24F 11/52 |
| 2017/0131830 | A1* | 5/2017 | Jiang | H03K 17/962 |
| 2017/0336088 | A1* | 11/2017 | Hynes | G06Q 30/04 |
| 2018/0012480 | A1* | 1/2018 | Matsuoka | G08B 17/10 |
| 2018/0267701 | A1* | 9/2018 | Rigg | G06F 3/0482 |

OTHER PUBLICATIONS

Serban, Alex. "6 of the Smartest Thermostats to Control Home Temperature Remotely" Technology Personalized. <http://techpp.com/2013/05/16/best-thermostats/>. Updated Apr. 24, 2014. (7 Pages).

* cited by examiner

THERMOSTAT WITH AN INTERACTIVE TWISTED NEMATIC DISPLAY

CROSS-REFERENCE TO RELATED APPLICATIONS

This application claims the benefit of U.S. provisional patent application Ser. No. 62/244,948, filed Oct. 22, 2015, the entire contents of which are incorporated herein by reference.

BACKGROUND

The present disclosure relates to an electronic device and, more particularly, to an electronic device having an interactive twisted nematic display.

Electronic devices often include user interfaces or interactive, liquid crystal display (LCD), touch screens for operating any variety of systems supported by the electronic device. The LCD displays typically utilize high-cost components. Reducing costs of interactive displays while maintaining or improving operation and reliability is desirable.

SUMMARY

An electronic device according to one, non-limiting, embodiment of the present disclosure includes a twisted nematic (TN) display configured to display at least one icon being interactive, and display information requested via the at least one icon; a control module coupled to the TN display and configured to receive a control command from the at least one icon and output the information to the TN display; and a computer readable memory coupled to the control module for storing at least a portion of the information.

Additionally to the foregoing embodiment, the TN display is a touch screen.

In the alternative or additionally thereto, in the foregoing embodiment, the electronic device is a thermostat.

In the alternative or additionally thereto, in the foregoing embodiment, the TN display is a capacitive touch overlay.

In the alternative or additionally thereto, in the foregoing embodiment, at least a portion of the TN display is configured to display in a plurality of colors depending upon a given condition as directed by the control module.

In the alternative or additionally thereto, in the foregoing embodiment, the TN display is configured to display the information in scrolling form.

A HVAC thermostat according to another, non-limiting, embodiment includes a TN display configured to display an idle screen format and a home screen format, wherein the idle and home screen formats includes an interactive first icon configured to display a first set of data when selected upon the idle screen format and a second set of data on the home screen format when selected; and a control module coupled to the TN display and configured to switch between the idle and home screen formats upon command.

Additionally to the foregoing embodiment, the idle screen format includes an interactive advance icon configured to advance the TN display to the home screen format when selected.

In the alternative or additionally thereto, in the foregoing embodiment, the second set of data includes at least one of outside temperature, outside weather conditions, inside humidity, outside humidity, time of day, replace filter reminder message, system malfunction information, energy usage information, equipment status, and lock status of thermostat.

In the alternative or additionally thereto, in the foregoing embodiment, the HVAC thermostat includes a computer readable storage medium coupled to the control module and configured to store at least a portion of the first and second sets of data.

In the alternative or additionally thereto, in the foregoing embodiment, the first set of data includes at least one of a tutorial, dealer contact information and Wi-Fi (i.e., IEEE 802.11x) registration information.

In the alternative or additionally thereto, in the foregoing embodiment, the first icon is a pre-defined first segment of the TN display and the first set of data is display in a pre-defined second segment of the TN display.

In the alternative or additionally thereto, in the foregoing embodiment, the second set of data is displayed in the second segment.

In the alternative or additionally thereto, in the foregoing embodiment, the TN display is configured to display in a plurality of colors as directed by the control module.

In the alternative or additionally thereto, in the foregoing embodiment, the first icon is a pre-defined first segment of the TN display, the first and second sets of data are displayed in a pre-defined second segment of the TN display, and the interactive advance icon is displayed in a pre-defined third segment of the TN display.

In the alternative or additionally thereto, in the foregoing embodiment, the home screen format includes an interactive return icon configured to return the TN display to the idle screen format when selected.

In the alternative or additionally thereto, in the foregoing embodiment, the interactive return icon is displayed in the pre-defined third segment of the TN display.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
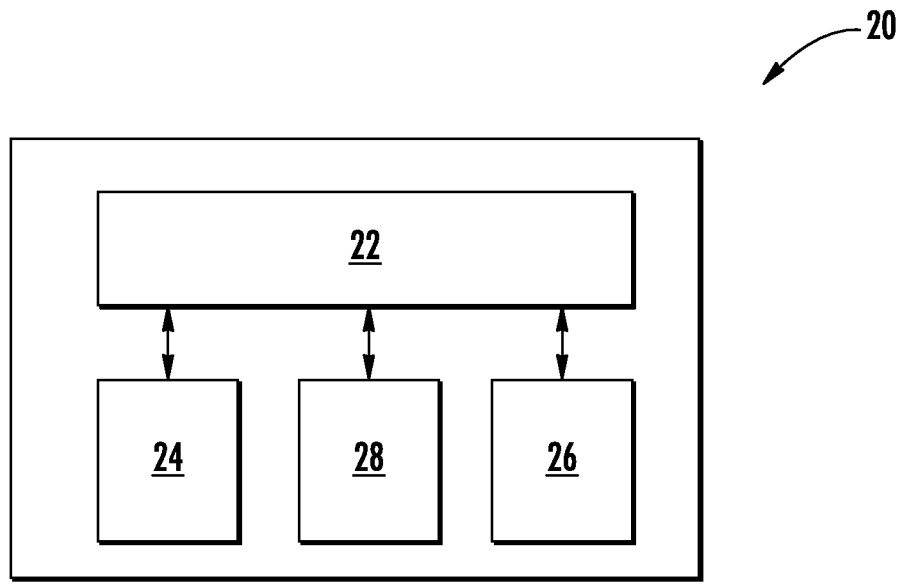
FIG. 1 is a schematic of an electronic device.

Referring to FIG. 1, an electronic device 20 as one exemplary embodiment of the present disclosure is illustrated. As one example, the electronic device 20 may be a thermostat that may be used for heating, ventilation, and air conditioning (HVAC) systems. The HVAC system may be a forced air system, a hydronic system, a radiant system, a boiler system, or any other type of system used to control, for example, temperature and humidity within a building. It is further contemplated and understood that the thermostat 20 may be applied to appliances such as, for example, refrigeration units, ovens and similar equipment.

The electronic device or thermostat 20 may include a control module 22, a computer readable storage medium 24, a data port 26 and an interactive twisted nematic (TN) display 28. The control module 22 may include a computer processor and may be configured to control external components (not shown) of the HVAC system to adjust any of operating parameters including, for example, air temperature, humidity, air quality, and others. The control module 22 may be configured to control and/or set any number of HVAC functions or programs including, for example, temperature setpoints, humidity setpoints, HVAC schedules, trend logs, timers, environment sensing, and others.

The storage medium 24 is configured to store information and data that may include the temperature and humidity setpoints, the HVAC schedules, trend logs, timers, environmental settings, geographical region, dealer or contractor information, Wi-Fi IEEE 802.11x) registrations information, service information (e.g. date of last filter change) and other data. The control module 22 is configured to retrieve and store information in the storage medium 24. The storage medium 24 may be, for example, random-access memory (RAM), read-only memory (ROM), electrically erasable programmable read-only memory (EEPROM), flash memory, or any other suitable medium or combination of mediums.

The data port 26 is configured to communicate with the control module 22. Examples of such communication may include upload and download of data including values of seasonal data for a specific geographic region, HVAC dealer(s) and/or service contractor information, outdoor temperature and humidity received from external temperature sensors (not shown) and other data. The control module 22 may utilize the information stored in the storage medium 24 and cause various indications and alerts to be displayed on the TN display 28 in any variety of ways.

The TN display 28 may be configured to display one or more operating parameters of the control module 20, one or more environmental parameters, service reminders, and other information. Environmental parameters may include, but are not limited to, indoor temperature and humidity, and outdoor temperature and humidity. The TN display 28 is interactive and may be of an LCD display and/or a touch screen with a capacitive touch overlay. The TN display 28 includes predefined artwork in predefined segments of the display. The various segments may be lit in any one of a plurality of colors at any given moment (e.g., eight colors), and as directed by the control module 22.

Figure 2:
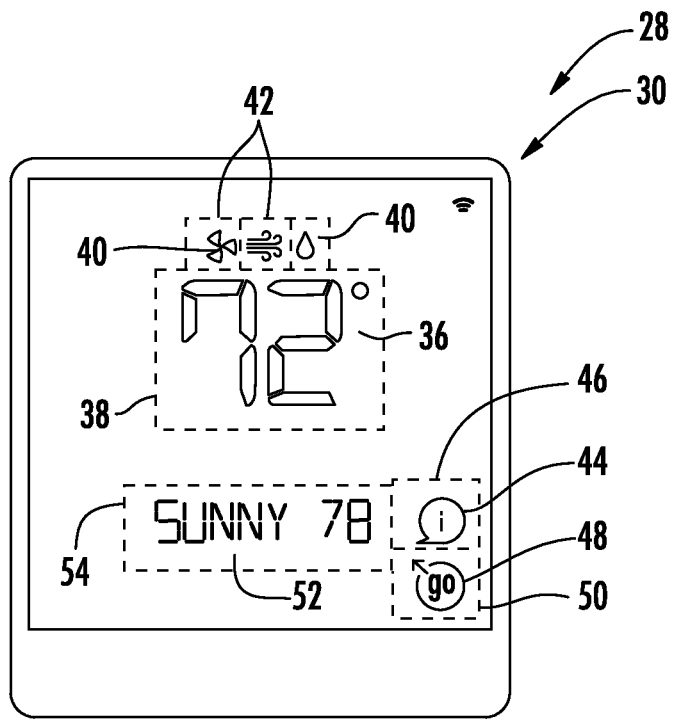
FIG. 2 is a front view of a TN display of the electronic device illustrated in an idle screen format.
Figure 3:
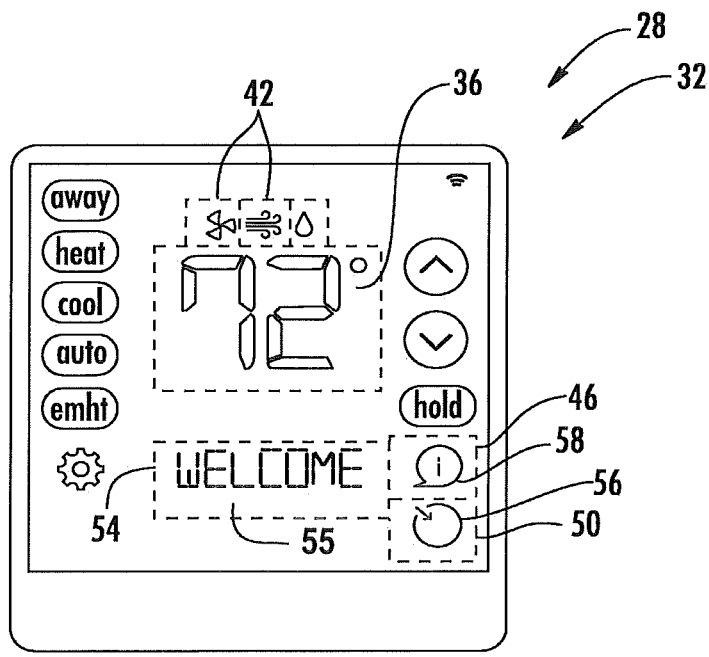
FIG. 3 is a front view of the TN display illustrated in a home screen format.
Figure 4:
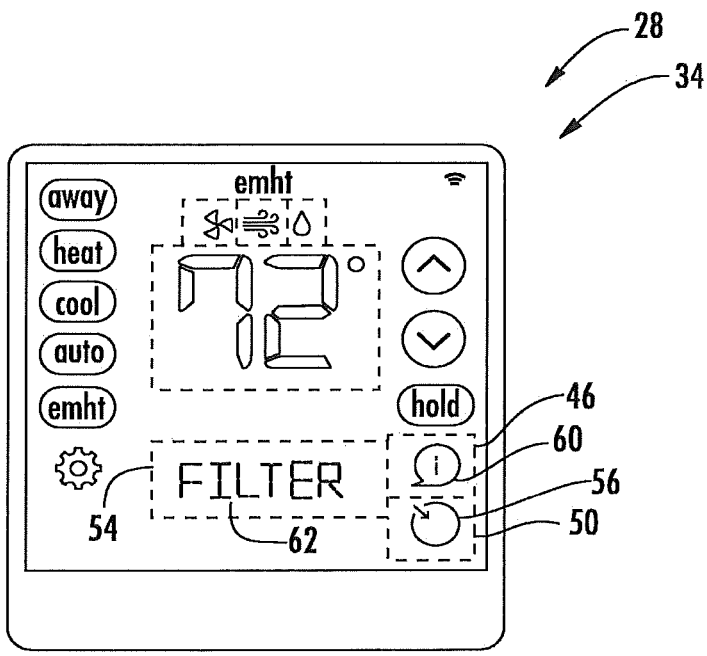
FIG. 4 is a front view of the TN display illustrated in an alert screen format.

Referring to FIGS. 2-4, the visualization of the TN display 28 may include an idle screen format 30 (see FIG. 2), a home screen format 32 (see FIG. 3), and an alert screen format 34 (see FIG. 4). The idle screen format 30 is generally the default screen. That is, the screen which is typically viewed by the user during normal HVAC system operation and when the user is not attempting to perform any tasks with the thermostat 20. All three formats 30, 32, 34 may display the real-time interior temperature 36 within a pre-defined segment 38 of the TN display 28, and may further display other indications 40 each within their respective segments 42 of the TN display. Each segment 38, 42 includes predefined artwork each having a plurality of elements configured to illuminate as commanded by the control module 22. The artwork is arranged such that the segment is capable of illuminating specific combinations of elements to create the desired visual character or shape.

The idle screen format 30 includes an interactive information icon 44 (e.g. an encircled "i") located within a segment 46 of the TN display 28, and an interactive advance icon 48 (e.g. an encircled "go" with an arrow symbol pointing outward) located within a segment 50 of the TN display 28. In operation, when the user touches the segment 46 having the information icon 44 a variety of information or data 52 may be revealed in another segment 54 of the TN display 28. For example, touching segment 46 may reveal weather conditions (e.g., sunny, rainy, cloudy, snow, etc.) and/or outside temperature in segment 54 (i.e., illustrated in FIG. 2). Touching segment 46 may reveal yet other data 52 such as the health of system components (e.g., air filters), inside or outside humidity, time of day, system malfunction information, energy usage information, equipment status (e.g., HP, AC, furnace, fan, etc.), lock status of thermostat, Wi-Fi (i.e., IEEE 802.11x) registration information, and others. Via the control module 22, the segment 54 may be capable of scrolling through the aforementioned data 52. For example, the scrolling function of segment 54 may be achieved by a continuous user touch upon segment 46, and release of segment 46 may stop the scrolling feature. In one embodiment, the scrolling function of segment 54 may be automatic with a fixed or user-adjustable scroll rate.

Segment 50 that illustrates the advance icon 48 may be configured (i.e., via the control module 22) to advance the TN display 28 from the idle screen format 30 to the home screen format 32 when the segment 50 is touched by the user. When in the home screen format 32, an interactive return icon 56 (e.g., a circle with an arrow pointing inward) may be illustrated in the segment 50 instead of the advance icon 48. When the segment 50 with the return icon 56 is touched, the home screen format 32 may return to the idle screen format 30. When in the home screen format 32, a help icon 58 (e.g., an encircled question mark symbol) may be illustrated in the segment 46 instead of the information icon 44. When the segment 46 with the help icon 58 is touched, the segment 54 of the TN display 28 may provide the same data 52 illustrated in the idle screen format 30 or may provide other data 55 strategically available (i.e. logically arranged) under the home screen format 32. Data 55 may initially include the "welcome" illustrated in FIG. 3. Touching of the help icon 58 may provide instructional data 55. That is, data 55 orientated under the home screen format 32 may include instructions on how to operate and/or change values and/or setpoints in various modes. Data 55 may also include a learning demonstration or tutorial.

The alert screen format 34 may appear as commanded by the control module 22. For example, the need to replace an air filter may cause the control module 22 to alert the user. When in the alert screen format 34, a second information icon 60 may be illustrated in the segment 46 instead of the first information icon 44. The visual difference between the two icons 44, 60 may be a difference in color (e.g. green to red). When the segment 46 with the information icon 60 is touched, the segment 54 of the TN display 28 may provide data 62 that may be different from data 52 and data 55. For example, data 62 may initially include a "filter" alert illustrated in red (i.e. as oppose to the color green used for data 52, 55). The term "filter" would alert the user that a problem with the HVAC system involves an issue with the air filter. By touching segment 46 now illustrating a red information icon 60, additional data 62 may be revealed in segment 54 that may be more descriptive of what the HVAC system problem is. Data 62 may also include other information such as service information, contact information for a local service repairman, and other data. It is contemplated and understood that data 52, 55, 62 and other data may be provided in any combination and distributed amongst any of the screen formats 30, 32, 34 with segment 54 as may make logical sense.

The present disclosure offers the benefit of a relatively inexpensive TN display relative to other LCD displays. Moreover, the present TN display offers real-time, on-display help and training of thermostat features by, at least in-part, utilizing a scrolling bar or TN segment 54 to preserve TN display surface area. Users utilizing thermostat 20 may not have a need to resort to a separate manual to learn how to operate the thermostat.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A heating, ventilation, and air conditioning thermostat comprising:
   a twisted nematic display configured to selectively display an idle screen format and a home screen format, wherein the idle and home screen formats include a common pre-defined first segment configured to selectively display an interactive first icon and an interactive second icon to respectively effect immediately displaying a first set of data relating to the heating, ventilation, and air conditioning thermostat when the interactive first icon is singularly selected upon the idle screen format and immediately displaying a second set of data relating to the heating, ventilation, and air conditioning thermostat on the home screen format when the interactive second icon is singularly selected;
   a control module coupled to the twisted nematic display and configured to switch between the idle and home screen formats upon command from the twisted nematic display; and
   a non-transitory computer readable storage medium in communication with the control module, and configured to store the idle and home screen formats,
   wherein the interactive first icon is displayed in the pre-defined first segment of the twisted nematic display and the first set of data is displayed in a pre-defined second segment of the twisted nematic display when in the idle screen format, and the interactive second icon is displayed in the pre-defined first segment of the twisted nematic display and the second set of data is displayed in the pre-defined second segment when the first set of data is not displayed in the home screen format, and wherein the interactive first icon and the interactive second icon are different in visual appearance;
   wherein the twisted nematic display includes a common pre-defined third segment configured to selectively display an interactive advance icon and an interactive third icon, the interactive advance icon being displayed when in the idle screen format and configured to advance the twisted nematic display to the home screen format when selected and thereby change the interactive first icon to the interactive second icon in the pre-defined first segment and change the interactive advance icon to the interactive third icon in the pre-defined third segment;
   wherein the interactive third icon is an interactive return icon displayed when in the home screen format and configured to return the twisted nematic display to the idle screen format when selected and change the interactive second icon to the interactive first icon in the pre-defined first segment when the interactive return icon is selected.

2. The heating, ventilation, and air conditioning thermostat set forth in claim 1, wherein the first set of data includes at least one of outside temperature, outside weather conditions, inside humidity, outside humidity, time of day, replace filter reminder message, system malfunction information, energy usage information, equipment status, and lock status of thermostat.

3. The heating, ventilation, and air conditioning thermostat set forth in claim 1, wherein the non-transitory computer readable storage medium is configured to store at least a portion of the first and second sets of data.

4. The heating, ventilation, and air conditioning thermostat set forth in claim 1, wherein the second set of data includes at least one of a tutorial, dealer contact information and IEEE 802.11x registration information.

5. The heating, ventilation, and air conditioning thermostat set forth in claim 1, wherein the twisted nematic display is configured to display in a plurality of colors as directed by the control module.

6. The heating, ventilation, and air conditioning thermostat set forth in claim 1, wherein the interactive return icon displayed in the pre-defined third segment of the twisted nematic display is visually different than the interactive advance icon.

* * * * *